Figure 1:
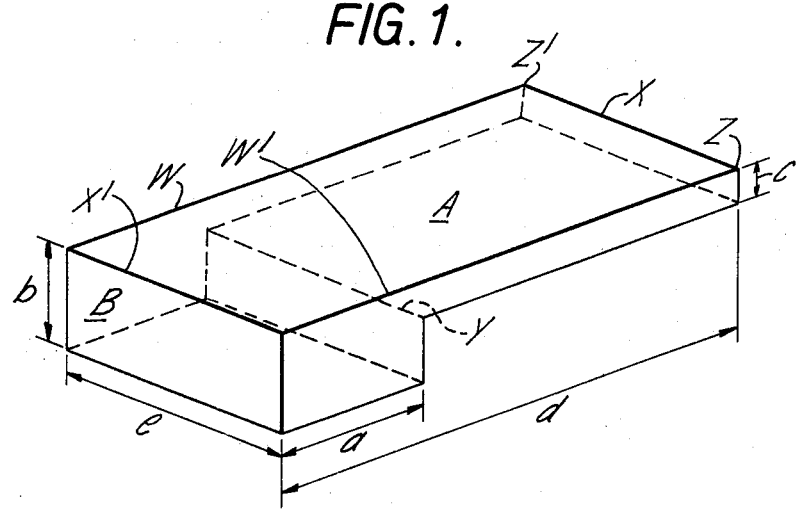

United States Patent [19]
Cardy et al.

[11] 3,968,061
[45] July 6, 1976

[54] POLYURETHANE FOAMS PREPARED BY A QUASI-PREPOLYMER TECHNIQUE

[75] Inventors: Charles Frederick Cardy, Luton; Stephen Arthur Lee, Dunstable, both of England

[73] Assignee: Interox Chemicals Limited, London, England

[22] Filed: Dec. 30, 1974

[21] Appl. No.: 537,347

[30] Foreign Application Priority Data
Jan. 11, 1974  United Kingdom............... 1351/74

[52] U.S. Cl.................. 260/2.5 AN; 260/2.5 AY
[51] Int. Cl.² ................ C08G 18/14; C08G 18/12
[58] Field of Search ............... 260/2.5 AN, 2.5 AY

[56] References Cited
UNITED STATES PATENTS

| | | | |
|---|---|---|---|
| 2,779,783 | 1/1957 | Hayes............................ | 260/2.5 AN |
| 2,977,385 | 3/1961 | Fowler et al................. | 260/2.5 AN |
| 3,018,256 | 1/1962 | Borr et al...................... | 260/2.5 AN |
| 3,591,561 | 7/1971 | Kazama et al. .............. | 260/2.5 AN |
| 3,741,918 | 6/1973 | Koleske et al................ | 260/2.5 AN |

*Primary Examiner*—H.S. Cockeram
*Attorney, Agent, or Firm*—Larson, Taylor and Hinds

[57] ABSTRACT

This invention relates to a method of preparing polyurethane foam which comprises the steps of forming an isocyanate-terminated prepolymer by reacting a polyisocyanate with a copolymer having an —OH- functionality greater than 2.00 but less than 3.00 derived from an ε-caprolactone, an epoxide and a mixture polyhydric alcohol chain initiators; and reacting said prepolymer in the presence of a blowing agent and a catalyst with a reactant mixture which comprises a chain extending agent having at least two functional groups each containing an active hydrogen atom, dissolved in a liquid copolymer of a lactone and an epoxide. The polyurethane foams are useful in the manufacture of shoe soles.

10 Claims, 3 Drawing Figures

POLYURETHANE FOAMS PREPARED BY A QUASI-PREPOLYMER TECHNIQUE

This invention relates to polyurethane foams.

In our British Patent Specification No. 1376331 we have described and claimed a method of forming a polyurethane foam by a "quasi-prepolymer" technique in which an oxyalkylene-carboxyalkylene copolymer of a lactone and an epoxide is reacted with a polyisocyanate to form a liquid prepolymer. The prepolymer is then reacted with a reactant mixture, which comprises a chain-extending agent having a plurality of functional groups each containing an active hydrogen atom dissolved in one or more liquid copolymers of a lactone and an epoxide, in the presence of a catalyst and a blowing agent. We have now found that this technique can be modified in order to produce particularly flexible and surprisingly quick-setting polyurethane foams, the foams produced by the preferred methods of the invention having a microcellular foam structure and being flexible, tough and tear-resistant.

In its broadest aspect, the present invention provides a method of preparing a polyurethane foam which comprises the steps of forming an isocyanate-terminated prepolymer by reacting a polyisocyanate with an oxyalkylene-carboxyalkylene copolymer derived from an ε-caprolactone, an epoxide and a mixture of polyhydric alcohol chain initiators, and having an average OH-functionality greater than 2.00 but less than 3.00; and reacting the said prepolymer with a reactant mixture which comprises a chain-extending agent having a plurality of functional groups each containing an active hydrogen atom dissolved in one or more liquid copolymers of a lactone and an epoxide, in the presence of a blowing agent and a catalyst.

More specifically, the present invention provides a method of preparing a microcellular polyurethane foam comprising the steps of a. preparing a random copolymer of an ε-caprolactone, ethylene oxide, a dihydric alcohol and a trihydric alcohol, the copolymer having an average OH-functionality greater than 2 but less than 3,
b. reacting the copolymer with a polyisocyanate to form an isocyanate-terminated prepolymer,
c. preparing a liquid reactant mixture including a chain extender, which contains at least two functional groups per molecule each having an active hydrogen atom, and a copolymer of an ε-caprolactone, ethylene oxide and a dihydric alcohol, and
d. reacting the prepolymer with a reactant mixture in the presence of a blowing agent, a surfactant and a catalyst.

The invention also includes a formulation for a polyurethane foam comprising (a) a prepolymer including an isocyanate-terminated liquid prepolymer derived from a polyisocyanate and a random copolymer of an ε-caprolactone, ethylene oxide, a dihydric alcohol and a trihydric alcohol, the copolymer having an average OH-functionality greater than 2 but less then 3, and (b) a reactant mixture comprising a random copolymer of an ε-caprolactone, a dihydric alcohol and ethylene oxide and a chain extender which comprises two or more functional groups per molecule each having an active hydrogen atom, a surfactant, a catalyst and a blowing agent.

The invention also includes moulded articles manufactured by the method of this invention. The foams can be used in the manufacture of a variety of articles, particularly those in which a combination of high tear strength, flexibility and good resilience is required, for example sealing strips, shoe soles, artificial feet, solid tyres, such as those used in perambulator wheels, and car bumpers.

In the manufacture of all these articles from polyurethane foams it is not only desirable that the foam be sufficiently flexible and tough when cured to withstand the wear and tear to which the article is to be subjected, but it is also desirable that the foam formulation be quick-setting so that the formulation can be injected into a mould, and removed from the mould as quickly as possible in order to work the mould to the maximum efficiency. We have discovered that, by adjusting the average OH-functionality of the random copolymer used in the polyurethane, the resulting foams can be removed from the moulds without damage in very short times. The flexibilities of the foams render them particularly useful for use as shoe soles.

The preferred foams are formed from prepolymers based on copolymers having an average OH-functionality of from 2.01 to 2.5, for example 2.40 and desirably from 2.01 to 2.20, e.g. from 2.1 to 2.20, the best foams being derived from copolymers of functionality 2.05 to 2.15.

Each molecule of the random copolymer used in the prepolymer is made up from units derived from an ε-caprolactone ethylene oxide, and a polyhydric alcohol initiator. The polyhydric alcohol will either be a dihydric alcohol, which will result in a copolymer molecule of OH-functionality 2, or a trihydric alcohol, which will result in a copolymer molecule of OH-functionality 3. When a mixture of di-and trihydric alcohols are used as initiator, the copolymer will be made up from a mixture of di- and tri-functional molecules so that its average OH-functionality is greater than 2, but less than 3. Although the copolymer could be prepared by mixing, in suitable proportions, di-functional and tri-functional copolymers which have been prepared separately, it is preferably prepared by reacting the lactone and epoxide with a mixture containing the di- and tri-hydric alcohol initiators.

The random polymer is conveniently prepared in accordance with the method of our British Patent Specification No. 1204/70 (Ser. No. 1356571). This method involves adding the lactone and the epoxide simultaneously, usually as a mixture, to a mixture of the diol and triol initiators and at a rate slower than the rate at which the lactone is consumed by reaction with the initiator or the growing chain. The reaction mixture thus is never allowed to contain a substantial quantity (e.g. more than 10% by weight) of the lactone. The progress of the reaction can be controlled by observing the consumption of lactone and epoxide by subjecting small samples of the reaction mixture to gas-liquid chromatography and adjusting the rate of addition of the lactone and epoxide mixture accordingly.

The lactone reacts slowly with the initiator or growing copolymer chains whilst the epoxide reacts very quickly. Consequently, by ensuring that no more than 10% (and preferably no more than 5% by weight) by weight of lactone is ever present in the reaction mixture at any one time, the copolymer chains can be built up regularly so that a "random" copolymer is formed. In this specification the term "random copolymer" is used to distinguish the copolymers which we use from "block polymers" in which large numbers of consecutive units in the copolymer chain are derived from the same monomer. The copolymers used in the present invention approach a regular distribution in which units derived from the epoxide alternate with units derived from the lactone. It will be appreciated that when the epoxide and lactone are not reacted in equimolar quantities it is inevitable that there will be present in the copolymer molecules small blocks of units derived from the lactone and/or epoxide. The number of units in these small blocks will however be low, e.g. from 2 to 5, and copolymers of this structure are not considered to be true block copolymers.

In view of the fact that relatively small volumes of initiators are used in comparison with the total quantity of epoxide and lactone, it is convenient to prepare an initial mixture of initiators and a sufficient quantity of lactone to enable the mixture to be stirred. The epoxide and lactone can then be stirred efficiently into the reaction mixture, thereby avoiding any local build-up of lactone or epoxide. Desirably the initial quantities of lactone and initiator are so chosen that there is sufficient lactone to react with all the initiator. In this way all the first links in the polymer chains will be derived from lactone molecules.

It is desirable that the coplymer be liquid at room temperature for ease of handling. We have found that in general liquid copolymers are formed when the epoxide forms 18% by weight or more of the copolymer. However the water-solubility of the copolymer increases with the epoxide content. In some cases, for example where boron trifluoride catalyst is used, we remove the catalyst from the copolymer by washing with water. We have found that copolymers having an epoxide content of more than 35% by weight are so soluble that they cannot be washed in water without serious wastage, and we therefore prefer to use copolymers having from 18 to 30%, desirably 18 to 23%, by weight of epoxide.

The relative quantities of dihydric alcohol and trihydric alcohol used determines the average functionality of the copolymer, and the total quantity of initiators used relative to the quantity of lactone and epoxide influences the molecular weight of the copolymer, small quantities of initiator being used for high molecular weight copolymers. Because one mole of copolymer will be derived from one mole of initiator, whether diol or triol, the quantity of lactone and epoxide required to produce a copolymer of a desired molecular weight can easily be calculated. The copolymers usually have molecular weights in the range 1500 to 3000. However, it is particularly convenient so to select the quantities of the initiators, lactone and epoxide that the molecular weight is always a fixed multiple of the functionality, with the result that the OH number of every copolymer will always be the same. This not only simplifies the calculation of the quantities of monomers required to form the copolymer, but also simplifies the calculation of the required quantity of isocyante because the same weight of copolymer can be reacted with the same weight of polyisocyanate regardless of the average functionality of the particular copolymers used. Although any figure may be chosen, we prefer to use copolymers in which the average molecular weight of the copolymer is always 1000 times the average functionality of the copolymer. Such copolymers will always consist of a mixture of copolymer molecules of OH-functionality 2 and average molecular weight 2000, and copolymer molecules of OH-functionality 3 and average molecular weight 3000, and the OH-number of the copolymer will always be 56.1 mg KOH/g. In practice there is always some variation in the OH number of the copolymer, usually between 38 and 75 copolymers of molecular weights in the range 3000 to 1500, but we prefer to use copolymers with OH-numbers between 45 and 65, for example from 50 to 60.

The di- and tri-hydric alcohols used as initiators are usually low molecular weight compounds, preferably with molecular weights below 140. Examples of suitable diols are glycols such as ethylene glycol, 1,4-butane diol, 1,6-hexane diol and neopentyl glycol, and alkylene ether glycols, e.g. di-ethylene glycol.

Examples of suitable trihydric alcohols or trimethylolpropane, glycerol and hexane triol.

Lewis acids are suitable catalysts for the formation of the copolymer, for example boron trifluoride, especially in the form of a complex with an organic compound such as diethylether; stannic chloride; aluminium chloride; and the chlorides of beryllium, zinc, cadmium, zirconium, antimony, bismuth and iron. It is sometimes advantageous to use boron trifluoride as a catalyst in combination with a proton acid, preferably a strong organic acid such as p-toluene sulphonic acid. The catalyst is preferably removed from the copolymer before the copolymer is incorporated into the prepolymer. This can often be achieved by washing the reaction product with water.

The reaction temperature for the preparation of the copolymer is normally in the range 50° to 120°C, preferably in the range 95° to 110°C.

Having prepared the random copolymer with an average OH-functionality between 2 and 3 it is reacted with a polyisocyanate, preferably a 4,4¹-diisocyanato diphenyl methane, to form a liquid prepolymer at a temperature in the range 50 to 170°C, usually between 80° and 150°C, for a period of from 5 minutes at the high temperatures to 20 hours at the low temperatures, and usually of about 60 minutes at the preferred temperatures.

The polyisocyanate may also be admixed with a fire retardant if desired.

A molar excess of the isocyanate is used in the preparation of the prepolymer, being usually in the range 40 to 80% by weight based on the weight of the copolymer, preferably 50 to 70% by weight and usually 60% by weight. If a larger excess than 80% is used, the isocyanate tends to crystallise out of the liquid; if an excess of less than 40% is used, the mixture is undesirably viscous.

The reactant mixture contains a chain extender and a random copolymer of ε-coprolactone, ethylene oxide and an initiator which is a dihydric alcohol and, optionally, a trihydric alcohol. The copolymer usually has an OH-functionality of 2.0, and a molecular weight in the range 1500 to 3000 preferably 1700 to 2500. This copolymer is also prepared by the method described above. If desired a copolymer with an average OH-functionality greater than 2.0 may be used, for example the same copolymer as is used in the preparation of the prepolymer. In that event however, it is undesirable for the copolymers to have OH-functionalities of more than 2.20, preferably from 2.05 to 2.15, since this promotes excessive cross-linking in the foam, and the foam becomes too rigid for use in shoe soles.

The chain extender which is incorporated in the reactant mixture comprises one or more compounds containing two or more functional groups having active hydrogen atoms. These compounds will generally be low molecular weight (less than 140) compounds for example diols such as 1,4-butane diol, ethylene glycol, diamines or alkanolamines such as ethanolamine or diethanolamine.

The reactant mixture should also contain a surfactant which will facilitate mixing of the reactant mixture with the prepolymer and stabilize the resulting foam. Any conventional surfactant may be used, e.g. Dow Corning's surfactant DC193, usually in an amount of from 0.2 to 1.0% e.g. 0.3 to 0.8% by weight of the reactant mixture. Other desired additives may be included in the reactant mixture, e.g. a pigment such as carbon black or any other of the pigments conventionally used in polyurethane foams. In order to form the foam the prepolymer is mixed with the reaction mixture in the presence of a catalyst and a blowing agent. The blowing agent may either be a compound, such as water, which reacts with the isocyanate to generate a blowing gas (carbon dioxide in the case of water) or a volatile liquid, for example a chlorofluorocarbon such as a Freon (Trade Mark), a chlorocarbon such as methylene chloride, or a hydrocarbon, which evaporates under the influence of the heat of reaction to generate the blowing gas. Mixtures of both these kinds of blowing agent may be used if desired. The blowing agent is desirably dissloved in the reactant mixture.

The quantities of copolymer, chain extender and blowing agent used in the reactant mixture depend upon the desired physical properties of the foam. Thus for any particular prepolymer, if a larger quantity of blowing agent is used in the reactant mixture the density of the foam will be lower. The resulting decrease in hardness of the foam can be compensated for by increasing the quantity of chain extender in the reactant mixture, but this in turn will require more prepolymer in the formulation of the foam. The quantity of chain extender and copolymer used also affects the viscosity of the reactant mixture and the ratio of isocyanate to OH groups in the foam. In general the quantities of these ingredients are so chosen that the density of the foam lies in the range 0.2 to 0.8 g/ml depending upon the use to which the moulded article is to be put, and the NCO/OH ratio in the foam is approximately 1.0 (normally in the range 0.95 to 1.05). Typically, the polyurethane foam for sealing strips will have a density of 0.2 to 0.4 g/ml, the foam for shoe soles will have a density of from 0.4 to 0.6 g/ml and the foams for solid tyres and vehicle bumpers will have densities in the range 0.6 to 0.8 g/ml.

It is also desirable so to formulate the reactant mix and prepolymer that they are mixed together in an approximately 1:1 ratio, for example in the range 0.90:1 to 1.10:1.

The mixing of the two components of the foam formulation is usually carried out at a temperature in the range 25° to 80°C. The reactant mixture may not necessarily have the same temperature as the prepolymer, and in our preferred foam formulations, the reactant mixture is maintained at a temperature of 50°C before mixing, and the prepolymer at a temperature of 40°C.

Any conventional polyurethane catalyst may be used for the foaming reaction, for example tertiary amine catalysts are preferred particularly triethylene diamine. The catalyst is usually incorporated in the reactant mixture before the two components of the foam formulation are mixed.

The following Examples illustrate the preparation of preferred copolymers used to form the prepolymer in our invention.

EXAMPLE 1

This example describes the preparation of a copolymer of average OH-functionality 2.4 and average molecular weight 2400. The proportions of the ingredients were calculated on the basis that one mole of diol and triol would each produce one mole of copolymer having an OH-functionality of 3 or 2. A mixtures of m moles of diol and n moles of triol therefore produce $n+m$ moles of a copolymer of average OH-functionality $$\frac{2m + 3m}{n + m}$$

Thus, for an average OH-functionality of 2.4, $m/n=3/2$.

The weight of epoxide required to produce 1 mole of copolymer of molecular weight 2,400 was calculated on the basis that 20% by weight of the copolymer would be derived from the epoxide, and the weight of caprolactone required per mole of copolymer was calculated by subtracting from 2,400 the gram molecular weight of the initiator mixture and the weight of the epoxide used per mole. All these weights were then corrected to a 1 kg scale.

A 2-liter flask equipped with a stirrer and a reflux condenser was charged with 22.33 g (0.1667 moles) of trimethylol propane and 25.99 g (0.2499 moles) neopentyl glycol. 120.0 g of $\epsilon$-caprolactone were then added to provide a sufficient quantity of liquid in the flask to enable the stirrer to be operated. To this mixture was added 1,2 g of boron trifluoride dietherate ($BF_3Et_2O$) and the mixture was stirred and heated to 96°C for 15 minutes. A mixture of 200g of ethylene oxide and 631.68 g of $\epsilon$-caprolactone was then added to the stirred mixture steadily over a period of 5 to 6 hours. The composition of the mixture was observed during the addition by subjecting samples of the mixture taken at regular intervals to gas-liquid chromatography, and the rate of addition was adjusted to maintain the free $\epsilon$-caprolactone content below 10% by weight. After the addition had been completed, the heating was continued until the free $\epsilon$-caprolactone content was less than 1%, in this case 0.3% by weight. The total reaction period was from 10 to 12 hours.

When the reaction had been completed, the product was formed into a 50% by weight solution in toluene and then washed 3 times at a temperature of 60°C with water to remove the boron catalyst, using water in an amount of one-third of the volume of the solution each time. The mixture was then dried by azeotropic removal of water, the toluene was removed by distillation and the resulting product was sparged with nitrogen at 150°C.

The resulting polymer was a white to pale yellow viscous liquid with an hydroxyl value of 56.6 mg KOH/g; an acid value of 0.42 mg KOH/g and a free caprolactone content of less than 0.2% by weight.

EXAMPLE 2

This example describes the preparation of a copolymer of average molecular weight 2,400 and an OH-functionality of 2.4 on a 1 kg scale. The copolymer was prepared by the method described in Example 1 using the following ingredients:

Initial mixture:
- Trimethylolpropane    22.33g (0.1667moles)
- Diethylene glycol    26.48g (0.249 moles)
- $\epsilon$-caprolactone    120.0 g
- $BF_3Et_2O$ catalyst    1.2 g Added mixture:
- $\epsilon$-caprolactone    631.19g
- Ethylene oxide    200.0 g The resulting copolymer was a white to pale yellow viscous liquid of hydroxyl value 56.2 mg KOH/g and acid value 0.4 mg KOH/g.

EXAMPLE 3

This example describes the preparation of a copolymer of average molecular weight 2150 and an OH-functionality of 2.15 on a 1 kg scale. Th copolymer was prepared by the method described in Example 1 using the following ingredients:

Initial mixture:
- Trimethylol propane    9.20 g (0.0697 moles)
- Neopentyl glycol    41.10 g (0.395 moles)
- $\epsilon$-caprolactone    120.0 g
- $BF_3Et_2O$ catalyst    1.20 g Added mixture:
- $\epsilon$-caprolactone    629.70 g
- Ethylene oxide    200.00 g The resulting copolymer was a white to pale yellow liquid with an hydroxyl value of 57.7 mg KOH/g, and an acid value of 0.37 mg KOH/g.

EXAMPLE 4

This example describes the preparation of a copolymer of average molecular weight 2050 and an average OH-functionality of 2.05 on a 1 kg scale. The copolymer was prepared by the method described in Example 1 using the following ingredients:

Initial mixture:
- Trimethylol propane    3.22 g (0.0243 moles)
- Diethylene glycol    49.12 g (0.464 moles)
- $\epsilon$-caprolactone    120.0 g
- $BF_3Et_2O$ catalyst    1.2 g Added mixture:
- $\epsilon$-caprolactone    627.66 g
- Ethylene oxide    200.00 g The resulting copolymer was a white to pale yellow viscous liquid with an OH value of 56.2 mg KOH/g and an acid value of 0.38 mg KOH/g.

EXAMPLE 5

This example describes the preparation of a copolymer of OH-functionality 2.0 and average molecular weight 2000 on a 1 kg scale. The copolymer was prepared by the method of Example 1 using the following ingredients:

Initial mixture:
- Neopentyl glycol    52.0 g (0.5 moles)
- $\epsilon$-caprolactone    120.0 g
- $BF_3Et_2O$ catalyst    1.2 g Added mixture:
- $\epsilon$-caprolactone    628.0 g
- Ethylene oxide    200.0 g The resulting copolymer was a white to pale yellow viscous liquid of hydroxyl value 54.3 mg KOH/g and acid value of 0.51 mg KOH/g.

Figure 2:
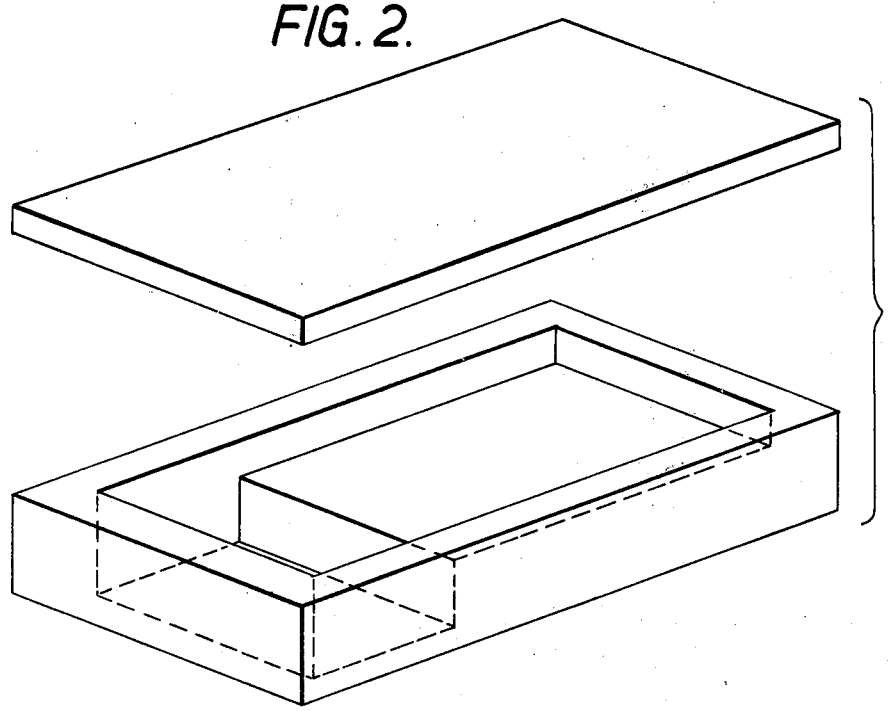
Figure 3:
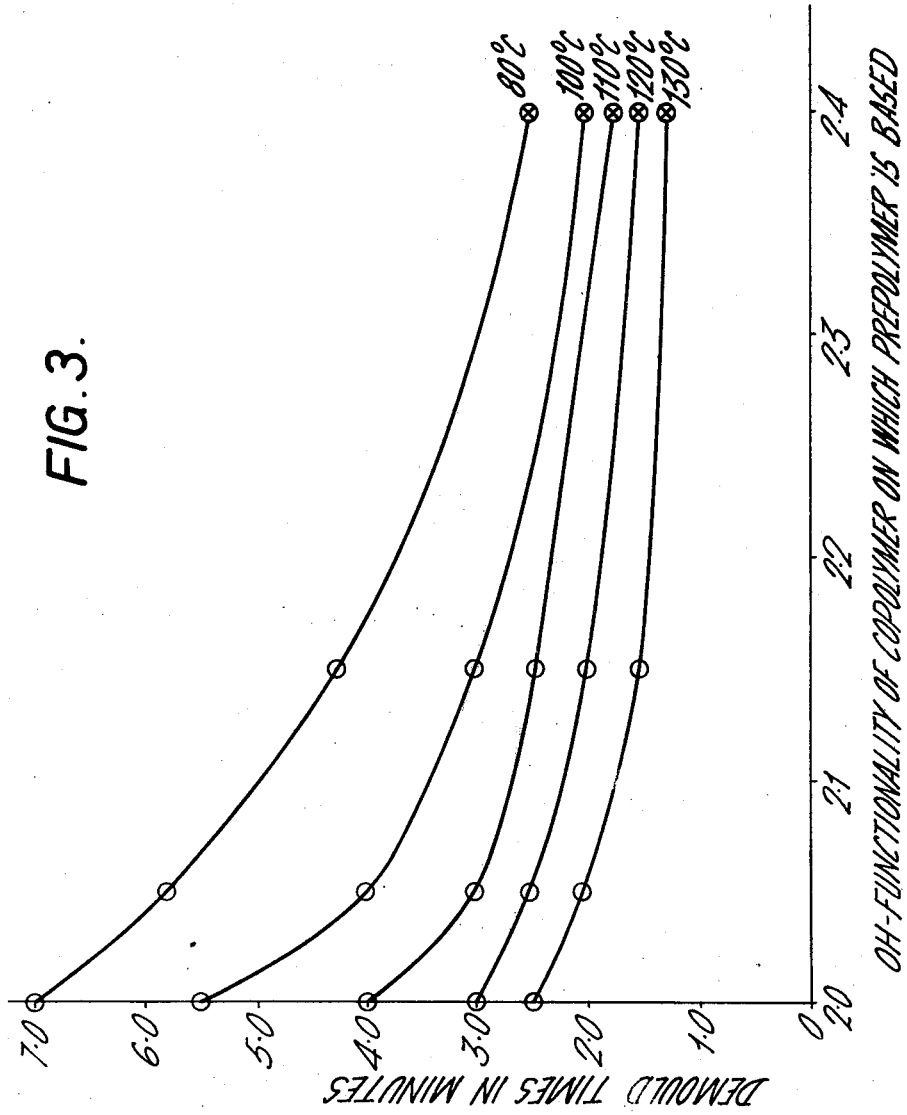

The invention will now be illustrated by way of Example only, in the following Examples and description in which reference is made to the accompanying drawings of which: FIG. 1 is a perspective view of a moulding used to determine the "demould time" of the foam; FIG. 2 is a perspective view of the mould used to form the moulding of FIG. 1; FIG. 3 is a graph showing the variation of the demould time with the average OH-functionality of the copolymer from which the prepolymer used to form the foam is derived.

Each of the copolymers prepared in the above Examples was made up into one or more series of prepolymers by heating a mixture containing 40% by weight of the copolymer with 60% by weight of 4,4$^1$-diisocyanato-diphenylmethane (manufactured by the Upjohn Company and sold as grade 125M), at temperatures of 80°, 100°, 110°, 120° and 130°C for 60 minutes. Each of the five prepolymers thus obtained from each of the copolymers was then cooled to 40°C.

Two reactant mixtures having compositions as shown in p.b.w. in Table I were then prepared and maintained at 50°C:

TABLE I

| | MIX 1 | MIX 2 |
|---|---|---|
| Copolymer of functionality 2.0 prepared as in Example 5. | 100.00 | 100.00 |
| Butane diol | 17.0 | 22.50 |
| Distilled Water | 0.35 | 0.63 |
| Triethylene diamine ("DABCO" (Trade Mark) ) | 1.25 | 1.25 |
| Surfactant (Dow Corning DC193) | 0.70 | 0.70 |
| Carbon Black (Multopren Paste (Bayer) | 6.25 | 5.00 |

The demould times of the foams formed from each of the formulations was then determined in accordance with the following test procedure.

In order to obtain maximum use of the mould in which the foam is formed, the foam should reach a state of cure in which it can be removed from the mould without damage to the moulding in as short a time as possible. When the moulding is a shoe sole, the moulding should also be flexible and tear resistant. This test procedure is designed to simulate the manufacturing conditions of shoe soles in which the proportions of reactant mixture and prepolymer injected into any one mould can vary by up to 4%, and in which the moulding is wrenched from the mould as soon as possible.

Each prepolymer based upon a copolymer of a specific average functionality is reacted with the same reactant mixture in a series of formulations in which the ratio of prepolymer to reactant mixture vary by 2% e.g. 1:0.94, 1:0.96, 1:0.98, 1:1.00, 1:1.02 etc. These formulations are mixed in a beaker using an electrically-driven high-shear stirrer, and poured into a mould which forms the foam into a slab of L-shaped cross-section. FIG. 2 is a sketch showing the shape of such a mould. The mould, which is a two-piece mould, is closed and maintained at a constant temperature, usually 50°C, so that a microcellular foam moulding results. FIG. 1 of the accompanying drawings shows a perspective view of the test mould. Part A corresponds to the flat sole portion of a shoe sole, and Part B to the heel portion.

The dimensions of the moulding, in inches, are as follows: a = 1½ ; b = ¾ ; c = ¼ ; d = 4 ; e = 3.

After the foam formulation has been poured into the mould it is allowed to react and the moulding is removed after a measured period of time has elapsed. The moulding is then tested as follows:

1. Observe any shrinkage or expansion after removal of the slab from the mould.
2. Squeeze the slab and gauge the resilience on the following scale: Very firm; Firm; Quite firm; Slightly Soft; Soft; Very Soft.
3. Bend corner Z or Z¹ into contact with the upper surface of the portion A and observe any cracking.
4. Observe any cracking along line Y.
5. Bring edge W into contact with edge W¹ and observe the lower surface of B to determine whether (a) cracks form with no significant bending; (b) cracks form after complete bending; (c) no cracks form after complete bending.

A formulation is considered to have passed the demould tests when (a) there is no shrinkage or expansion after removal from the mould; (b) the resilience is "Very firm", "Firm" or "Quite Firm"; (c) there is no cracking in tests 3 and 4, and (d) any cracks which do form in test 5 only appear after substantial bending.

The time elapsing before any particular formulation passes the test is noted as the "demould time" for that foam. The minimum demould times for all the formulations using the same prepolymer are then compared. When the same minimum demould time is obtained from formulations in which the relative quantities of prepolymer and reactant mixture differ by 4%, that demould time is considered to be an accurate assessment of the minimum period which must be allowed under manufacturing conditions before the moulding can be removed from its mould.

The results of the tests are set out in Tables II and III.

The foams of Examples 6 to 30 (Table II) were obtained using reactant mix 1 of Table I and all had densities of 0.6 gm/ml. The foams of Example 31 to 34 (Table III) were obtained using reactant mix 2 of Table I and all had densities of 0.4 gm/ml. It will be observed from Tables II and III that the use of a different reactant mixture with the same prepolymer produced no alternation in the demould time of the foam. The foams of Examples 21 to 25 were based upon prepolymers prepared using the copolymer of Example 1, had the same demould time as the foams based upon the prepolymer prepared using the copolymer of Example 2, (Examples 26 to 30).

TABLE II

| Example No. | OH-Functionality of copolymer on which prepolymer is based. | Temperature of prepartion of prepolymer in °C | Demould time in minutes |
|---|---|---|---|
| 6 | 2.0 | 80 | 7.0 |
| 7 | 2.0 | 100 | 5.5 |
| 8 | 2.0 | 110 | 4.0 |
| 9 | 2.0 | 120 | 3.0 |
| 10 | 2.0 | 130 | 2.5 |
| 11 | 2.05 | 80 | 5.75 |
| 12 | 2.05 | 100 | 4.0 |
| 13 | 2.05 | 110 | 3.0 |
| 14 | 2.05 | 120 | 2.5 |
| 15 | 2.05 | 130 | 2.0 |
| 16 | 2.15 | 80 | 4.25 |
| 17 | 2.15 | 100 | 3.0 |
| 18 | 2.15 | 110 | 2.5 |
| 19 | 2.15 | 120 | 2.0 |
| 20 | 2.15 | 130 | 1.5 |
| 21 | 2.40 | 80 | 2.5 |
| 22 | 2.40 | 100 | 2.0 |
| 23 | 2.40 | 110 | 1.75 |
| 24 | 2.40 | 120 | 1.5 |
| 25 | 2.40 | 130 | 1.25 |
| 26 | 2.40 | 80 | 2.5 |
| 27 | 2.40 | 100 | 2.0 |
| 28 | 2.40 | 110 | 1.75 |
| 29 | 2.40 | 120 | 1.5 |
| 30 | 2.40 | 130 | 1.25 |

TABLE III

| Example No. | OH-Functionality of copolymer on which prepolymer is based. | Temperature of preparation of prepolymer in °C | Demould time in minutes. |
|---|---|---|---|
| 31 | 2.0 | 110 | 4.0 |
| 32 | 2.0 | 130 | 2.5 |
| 33 | 2.4 | 110 | 1.75 |
| 34 | 2.4 | 130 | 1.5 |

The results set out in Table II are also shown in FIG. 3 of the accompanying drawings, which is a graph of the demould times obtained from the formulations against the OH-functionality of the copolymer used in the prepolymer for each of the reaction temperatures.

It can be seen from FIG. 3 that the use of copolymer of average functionality greater than 2.0 produces a marked decrease in the demould time of the foam. Moreover, it can be seen that for any given demould time, the temperature at which the prepolymer must be prepared also decreases with increasing OH-functionality of the copolymer. This not only enables a shoe sole mould to be used with greater efficiency, but also enables the process for preparing the prepolymer to be operated at a lower temperature, and therefore more cheaply than one in which the prepolymer is based on a copolymer of OH-functionality 2.

It can be seen that the effect of increasing the OH-functionality of the copolymer decreases as the functionality increases. Additionally, the soles become more inflexible as the functionality of the copolymer increases and shoe soles prepared from copolymers of OH-functionality 3 or more have poor flex properties, and crack more readily.

What is claimed is:

1. A method of preparing a polyurethane foam by a quasi-prepolymerization technique which comprises the steps of:
    a. forming a first copolymer having an —OH number in the range of from 38 to 75 mg KOH/g from an ε-caprolactone, an epoxide and a mixture of a dihydric alcohol and a trihydric alcohol, said copolymer having an average —OH-functionality greater than 2.00 but less than 3.00;
    b. reacting said first copolymer with a polyisocyanate to form an isocyanate terminated prepolymer;
    c. preparing a reactant mixture comprising: a chain extender, which is a diol having a molecular weight below 140, dissolved in: a second copolymer having an —OH number in the range of from 38 to 75 mg KOH/g formed by reaction of an ε-caprolactone, an epoxide, a dihydric alcohol and sufficient trihydric alcohol that the said copolymer has an —OH-functionality in the range of 2.0 to 2.20, and d. reacting said prepolymer with said reactant mixture in the presence of a blowing agent and a catalyst.

2. A method according to claim 1 wherein the said —OH-functionality of the said first copolymer is in the range of from 2.05 to 2.15.

3. A method according to claim 1 wherein the said first copolymer contains from 18–23% by weight of said epoxide.

4. A method according to claim 1 wherein the said first copolymer has an —OH number in the range of from 50 to 60 mg KOH/g.

5. A method according to claim 1 wherein the said first copolymer is a random copolymer.

6. A method according to claim 5 wherein the said random copolymer is prepared by adding the ε-caprolactone and ethylene oxide in the ratio desired in said random copolymer, simultaneously to a mixture of the dihydric alcohol and the trihydric alcohol, at a rate slower than the maximum rate at which the lactone could be consumed by reaction with the hydroxyl groups.

7. A method according to claim 5 wherein the dihydric alcohol is selected from the group consisting of ethylene glycol, 1,4-butane diol, 1,6-hexane diol, neopentyl glycol or diethylene glycol and the trihydric alcohol is selected from the group consisting of trimethylol-propane, glycerol or hexane triol.

8. A method according to claim 1 wherein the prepolymer contains a molar excess of the polyisocyanate from 40 to 80% by weight based on the weight of said first copolymer.

9. A method according to claim 1 wherein the polyisocyanate is 4,4'-diisocyanato diphenyl methane.

10. A method according to claim 1 wherein the said second copolymer is a random copolymer.

* * * * *